(No Model.)
G. E. YOST.
CAR AXLE BOX.
No. 254,857. Patented Mar. 14, 1882.
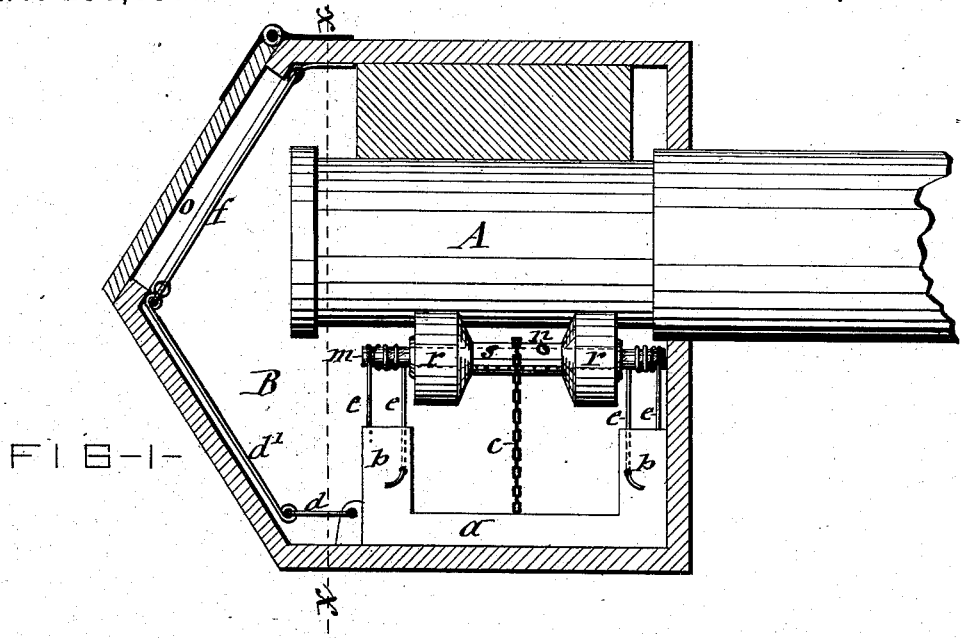
FIG-1-
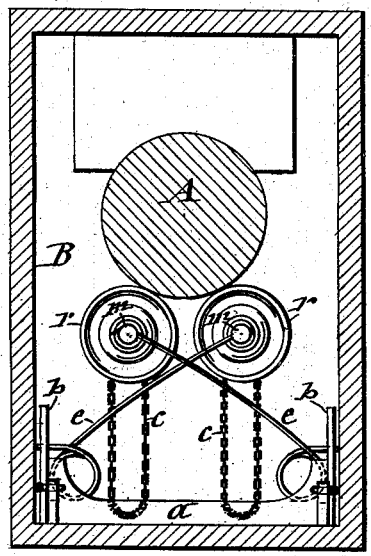
FIG-3-
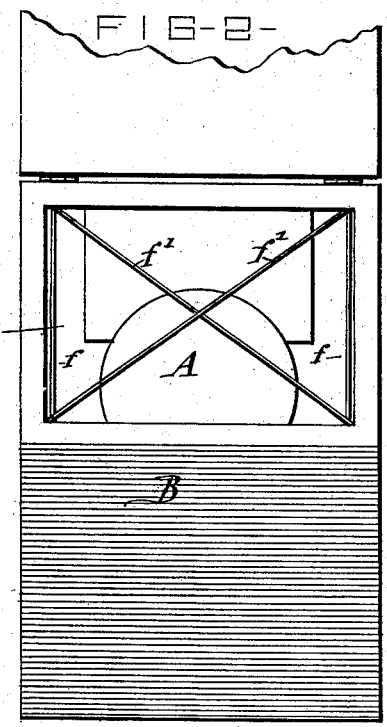
FIG-2-
WITNESSES=
Geo. F. Raymond
C. H. Duell
INVENTOR=
George E. Yost
per Duell, L. a. ass't Hey
his Attorneys

UNITED STATES PATENT OFFICE.

GEORGE E. YOST, OF THERESA, NEW YORK.

CAR-AXLE BOX.

SPECIFICATION forming part of Letters Patent No. 254,857, dated March 14, 1882.

Application filed December 30, 1881. (No model.)

*To all whom it may concern:*

Be it known that I, GEORGE E. YOST, of Theresa, in the county of Jefferson, in the State of New York, have invented new and useful Improvements in Car-Axle Lubricators, of which the following, taken in connection with the accompanying drawings, is a full, clear, and exact description.

This invention relates to improvements in that class of car-axle lubricators in which the lubricant is thrown upon the journal of the axle by means of an endless chain drawn through the lubricant in the base or cellar of the axle-box and carried by the shaft of two rollers which are held in contact with the journal of the axle and rotated by such contact and motion of the journal.

The invention consists, first, in the combination, with the car-axle journal and its lubricating-box, of a certain frame which is removably fitted to the base or cellar of the lubricating-box and sustains the lubricating mechanism securely in position; and, secondly, in the combination, with the aforesaid frame, of a bail connected thereto and formed with diagonal bars across the front opening of the journal-box to serve as guards to apprise persons of the use of the improved lubricating mechanism on said journal-box and prevent such persons from introducing the usual waste, which would interfere with the operation of the said lubricating mechanism, all as hereinafter more fully described, and specifically set forth in the claims.

In the annexed drawings, Figure 1 is a longitudinal section of a car-axle journal-box provided with my improvements. Fig. 2 is a front view of the same with the usual front cover removed to expose the guard which is designed to prevent the introduction of waste into the journal-box; and Fig. 3 is a transverse section on lines $x\ x$, Fig. 1.

Similar letters of reference indicate corresponding parts.

A represents the journal of a car-axle, and B the usual box which incloses said journal and carries in its lower portion (commonly termed the "cellar") the lubricant for the journal.

Various mechanical appliances have been devised for carrying the lubricant from the cellar of the journal-box to the journal of the axle in lieu of the cotton waste which is usually inserted in the journal-box to apply the lubricant to the journal by capillary action. The nearest approach to my invention is the employment of two rollers united by a shaft which is fixed thereto and carries an endless chain which is suspended from said shaft and runs through the lubricant in the cellar of the journal-box, said rollers being held in contact with the journal and rotated by such contact, the rotation of the rollers imparting a rapid longitudinal movement to the endless chain, which in its movement carries with it the requisite quantity of lubricant and throws the same against the journal of the axle. The aforesaid two rollers were heretofore arranged to bear with their periphery against the under side of the journal at points in a perpendicular line from the axial center of the journal and were held there by spiral springs. The result was that the said rollers had a tendency to swing out of position, and instead of running parallel with the journal they were thrown with their axis diagonally across the journal, and thus rendered inoperative.

In order to prevent the aforesaid objectionable operation and effects, I arrange the rollers $r\ r$ to bear against the journal A at points past a perpendicular line from the axial center of the journal, as best seen in Fig. 3 of the drawings, and sustain said rollers in their position by means of spring-arms $e\ e$, which are at one end secured to a frame, $a$, hereinafter described, and have secured to their free end a mandrel, $m$, upon which are loosely mounted the rollers $r\ r$, said rollers being united by a shaft, $s$, which is rigidly attached thereto and has passing through it the mandrel $m$ aforesaid. An oil-hole, $n$, in the shaft $s$ serves to admit the lubricant to the bearing between the shaft $s$ and mandrel $m$. The usual endless chain, $c$, is suspended from the shaft $s$ and passes through the lubricant in the cellar of the box B. The shaft $s$ is made angular or of such form as to obtain a proper hold upon the chain $c$ to propel the same longitudinally by the rotation of the shaft $s$. The movement of the chain throws the lubricant upon the journals of the axle, as aforesaid. The frame $a$, which sustains the spring-arms $e$, is made in the form of a skeletonframe fitted to the base or cellar of the box B, and provided with lugs or ears $b\ b$, to which the spring-arms $e\ e$ are attached.

In order to insure the efficiency of the described arrangement of the rollers $r\ r$, I employ two sets of such rollers bearing against the journal respectively at opposite sides of the perpendicular line from the axial center of the journal, each of said sets of rollers being sustained in contact with the journal by means of spring-arms $e$, connected to the frame $a$, as before described.

To the front end of the frame $a$ is attached a bail, by means of which said frame can be easily drawn out of the box B, when required. This bail is formed in sections $d$, $d'$, and $f$, linked together, the section $d$ extending from the end of the frame $a$ to the base of the front plate of the journal-box B, the section $d'$ extending upward the length of the aforesaid front plate, and the section $f$ extending from the end of the bail $d'$ to the top plate of the box B. The whole, when in place, serves to hold the frame $a$ in its position, as seen in Fig. 1 of the drawings. At the usual opening, $o$, in the front end of the box B the bail-section $f$ is provided with bars $f'\ f'$, which extend diagonally across the opening $o$, and aside from bracing the bail serve as guards to prevent persons from introducing the usual cotton waste which railroad men are in the habit of applying to car-axle-lubricating boxes, and the application of which waste would destroy the operation of the described lubricating mechanism.

I do not claim broadly a lubricating device held yieldingly in contact with and rotated by the journal to be lubricated, as I am aware the same is not new; but What I do claim as my improvement, and desire to secure by Letters Patent, is—

1. In combination with the journal A and box B, the frame $a$, provided with ears $b\ b$, the spring-arms $e\ e$, fixed to said ears and extended diagonally across the journal-box B and carrying respectively at opposite sides of the journal the mandrel $m$ and the rollers $r$, journaled on said mandrel, and provided with the endless chain $c$, substantially as set forth.

2. The combination, with the frame $a$, supporting the rollers $r\ r$, with their lubricating-chain $c$, as set forth, of the bail formed of sections $d$, $d'$, and $f$, the latter of which is provided with the diagonal bars $f'\ f'$ across the front opening of the journal-box B, substantially as described and shown.

In testimony whereof I have hereunto signed my name and affixed my seal, in the presence of two attesting witnesses, at Syracuse, in the county of Onondaga, in the State of New York, this 16th day of December, 1881.

GEO. E. YOST. [L. S.]

Witnesses:
C. H. DUELL,
WM. C. RAYMOND.